United States Patent
Veit et al.

(10) Patent No.: US 6,935,483 B2
(45) Date of Patent: Aug. 30, 2005

(54) METAL FRAME SORTER WITH WEAR STRIP

(75) Inventors: Frank W. Veit, Spring Lake, MI (US); Rhonda J. Verploegen, Sparta, MI (US); Mark S. Harkema, Grand Rapids, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/941,734

(22) Filed: Sep. 15, 2004

(65) Prior Publication Data

US 2005/0056529 A1 Mar. 17, 2005

Related U.S. Application Data

(60) Provisional application No. 60/481,385, filed on Sep. 16, 2003.

(51) Int. Cl.[7] .............................................. B65G 47/46
(52) U.S. Cl. ................. 198/370.02; 198/837; 198/841; 198/779
(58) Field of Search ...................... 198/370.02, 370.07, 198/838, 841, 842, 837, 860.1, 779

(56) References Cited

U.S. PATENT DOCUMENTS

| | | | | |
|---|---|---|---|---|
| 4,168,004 A | * | 9/1979 | Owen .......................... | 209/545 |
| 5,060,788 A | * | 10/1991 | Compton et al. ........... | 198/831 |
| 5,311,982 A | * | 5/1994 | Clopton ...................... | 198/779 |
| 5,588,520 A | | 12/1996 | Affaticati et al. | |
| 5,590,758 A | | 1/1997 | Wilkins et al. | |
| 5,613,591 A | * | 3/1997 | Heit et al. .............. | 198/370.02 |
| 6,478,138 B1 | | 11/2002 | Edwards et al. | |

FOREIGN PATENT DOCUMENTS

| | | | |
|---|---|---|---|
| EP | 1232965 | * | 8/2002 |
| WO | WO02/26602 A2 | | 4/2002 |

\* cited by examiner

Primary Examiner—James R. Bidwell
(74) Attorney, Agent, or Firm—Van Dyke, Gardner, Linn & Burkhart, LLP

(57) ABSTRACT

A sortation system includes a metal frame member and a traveling member having a series of wheels supported by the frame member. The traveling member defines an upper surface that supports articles being sorted. A wear strip is provided between said frame member and the wheels. The wear strip is made up of at least one wheel support strip and a sound deadening material between the at least one wheel support strip and the frame member.

26 Claims, 6 Drawing Sheets

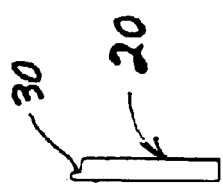
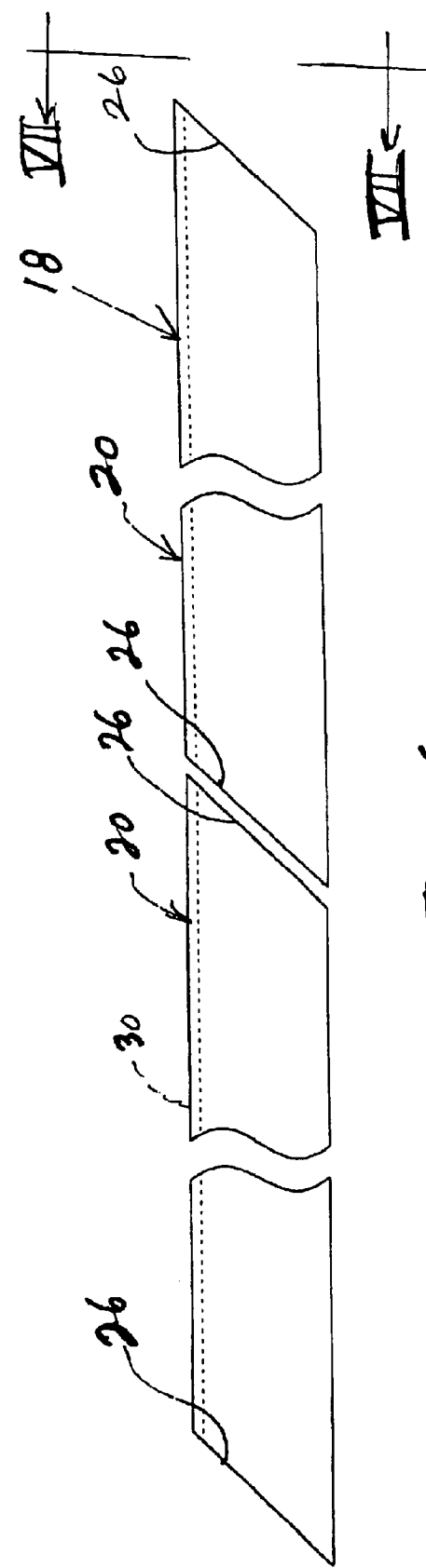
Fig 7
Fig 6

METAL FRAME SORTER WITH WEAR STRIP

CROSS REFERENCE TO RELATED APPLICATION

The present application claims the benefit of U.S. provisional application Ser. No. 60/481,385, filed on Sep. 16, 2003, which is hereby incorporated herein by reference in its entirety.

BACKGROUND OF THE INVENTION

The present invention pertains to sortation systems and, in particular, to sortation systems having a traveling member defining an upper surface supporting the articles being sorted and having wheels supported by a metal frame member. The invention is particularly useful with such a system having an extruded aluminum frame member.

Sortation systems having extruded aluminum frame members are subject to wear from travel by the wheels supporting the traveling member. It would require significant disassembly of the sorter to replace the frame member. Moreover, extruded aluminum frame members typically enclose hollow chambers. Such chambers can act as sounding boards, thereby amplifying any acoustic noise emitted by the sorter, especially for high-speed sorters.

SUMMARY OF THE INVENTION

The present invention provides a replaceable wear strip for a sortation system having an extruded aluminum frame member. The wear strip reduces acoustical noise emitted by the sorter. A sortation system, according to the invention, includes a metal frame member and a traveling member having a series of wheels supported by the frame member. The traveling member defines an upper surface that supports articles being sorted. A wear strip is provided between the frame member and the wheels. The wear strip includes at least one wheel support strip and a sound deadening material between the at least one wheel support strip and the frame member.

These and other objects, advantages and features of this invention will become apparent upon review of the following specification in conjunction with the drawings.

BRIEF DESCRIPTION OF THE DRAWINGS

FIG. 6 is a top plan view of a wear strip; and

FIG. 7 is a side view taken from the direction VII—VII in FIG. 6.

DESCRIPTION OF THE PREFERRED EMBODIMENT

Figure 1:
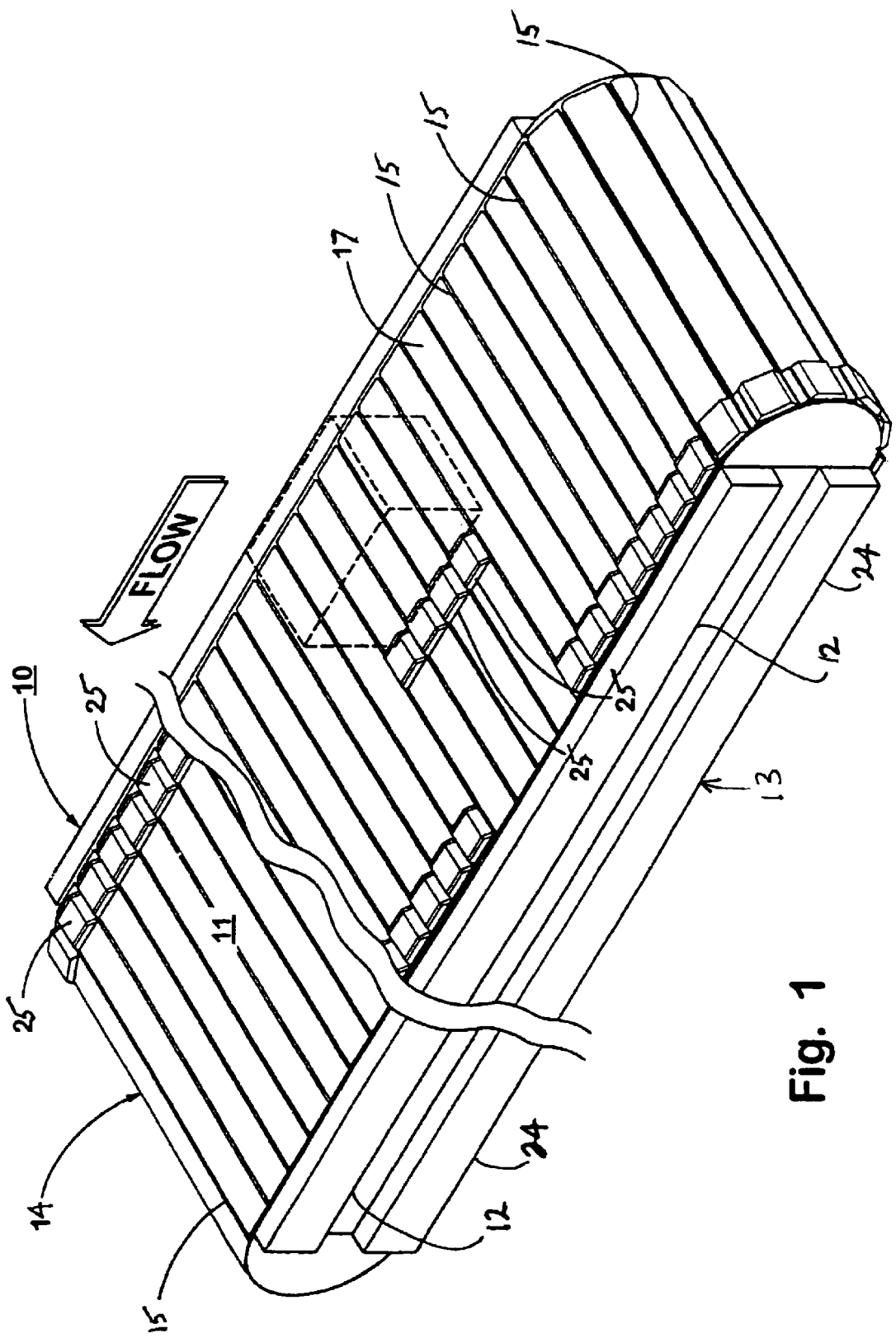
FIG. 1 is a perspective view of a sortation system according to the invention.
Figure 2:
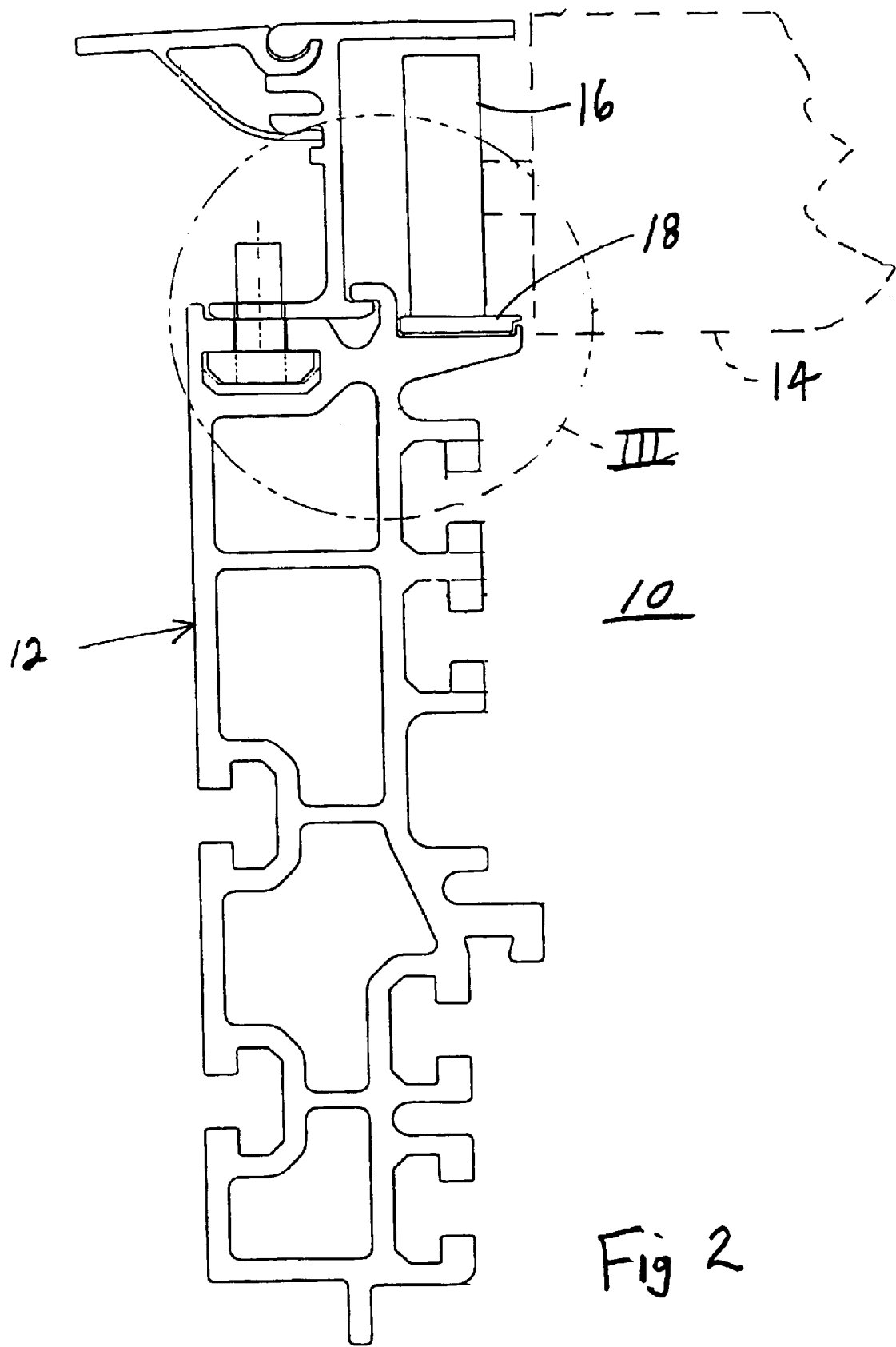
FIG. 2 is a sectional view of a sortation system showing an upper frame member and a traveling member traveling on the frame member.
Figure 3:
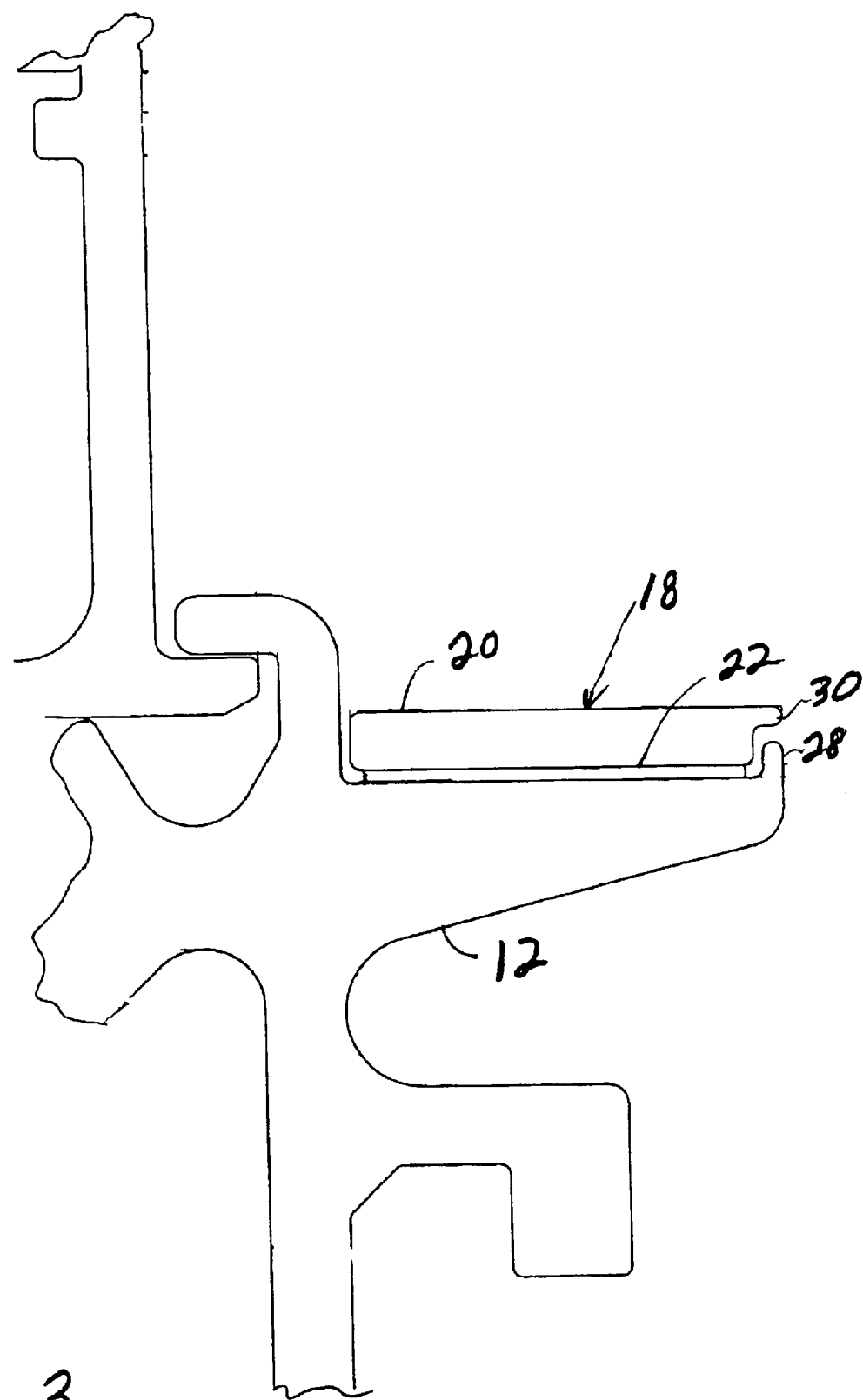
FIG. 3 is an enlargement of the area designated III in FIG. 2.
Figure 4:
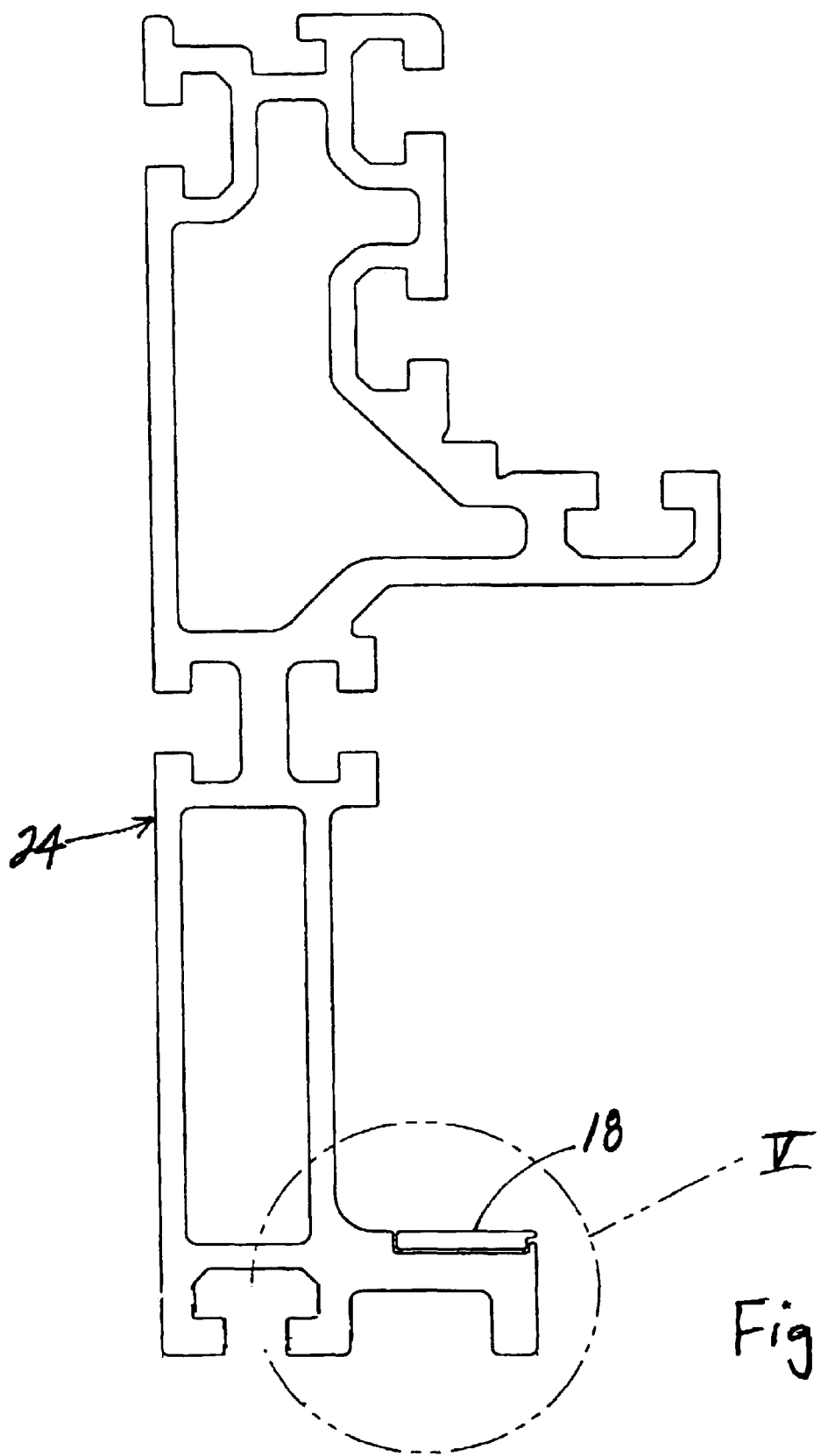
FIG. 4 is the same view as FIG. 2 of a lower frame member.
Figure 5:
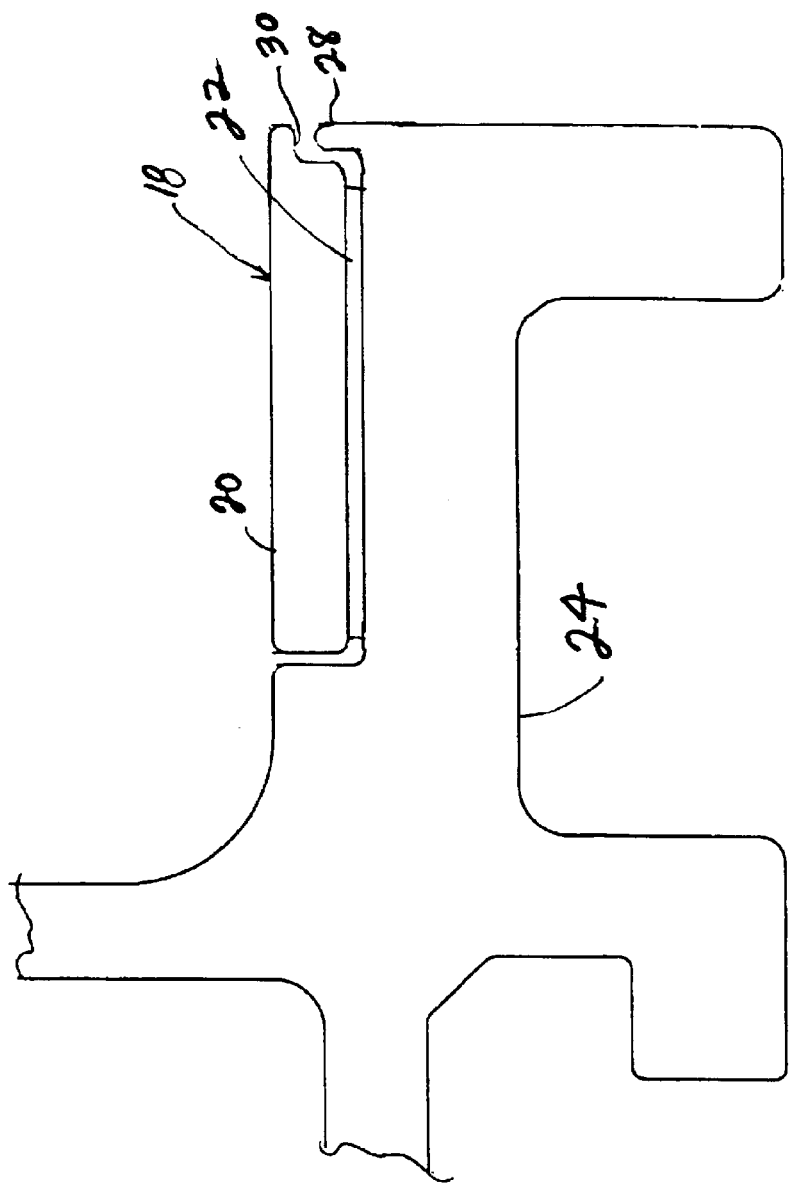
FIG. 5 is an enlargement of the area designated V in FIG. 4.

Referring now to the drawings and the illustrative embodiments depicted therein, a sortation system 10 is made up of a frame 13 and a traveling member 14 having wheels 16 supporting the traveling member for movement along the frame. In the illustrative embodiment, traveling member 14 is made up of a plurality of slats 15, which are interconnected in an endless web 17 with pusher shoes, or diverter shoes, 25 traveling along some or all of the slats to laterally displace articles on a conveying surface 11 defined by an upper surface of a top run of endless web 17 (FIG. 1). Diverter assemblies (not shown) laterally displace pusher shoes 25 to divert articles onto selected spurs (not shown) in order to sort the articles. To do this, the diverter assemblies include diverter rails (not shown) extending diagonally across the conveying surface beneath the web and diverter switches to divert pusher shoes to individual diverter rails.

Further details of sorter assembly 10 not provided herein are disclosed in detail in commonly assigned International Application Publication No. WO 02/26602 A2 and U.S. patent application Ser. No. 09/968,742 filed Sep. 28, 2001, by Veit et al., the disclosures of which are hereby incorporated herein by reference. In the illustrative embodiment, sortation system 10 is a liner sorter, such as disclosed in commonly assigned International Application Publication No. WO 02/26602 A2, in which case, traveling member 14 is embodied in endless web 17. Alternatively, the invention may be embodied in a sortation system that is a carousel sorter, such as a tilt tray sorter or a cross belt sorter. Examples of carousel sorters are disclosed in commonly assigned U.S. Pat. Nos. 5,588,520 and 6,478,138, the disclosures of which are hereby incorporated herein by reference. In the case of a carousel sorter, traveling member 14 is embodied in carriages having tilting trays or transverse belts supporting the articles being sorted.

In the illustrative embodiment, frame 13 is made up of a top frame member 12 and a bottom frame member 24. Frame members 12, 24 are metal and, in the illustrative embodiment, are extruded aluminum. As previously discussed, traveling member 14 is supported by wheels 16, which travel on frame members 12, 24. Wheels 16 may be made from a polymeric material or may have a polymeric tire over a metal wheel, or the like. The wheel could also have a metal tire.

A wear strip, or track, 18 provides an interface between wheels 16 and the respective frame member 12, 24. Wear strip 18 includes a wheel support strip 20, contacted by the wheels, and a sound deadening material 22 between the wheel support strip and the respective frame members 12, 24. In the illustrative embodiment, wheel support strip 20 is a hard material such as aluminum, steel, high strength plastic, or the like. Wheel support strip 20 may be hard coated, such as by treatment with a hard coat anodize, to increase hardness. Wheel support strip may be formed by extruding the selected material through a die designed to the desired cross-section of the wheel support strip. The surface of the wheel support strip has a hardness that is greater than the hardness of the sound deadening material. This increases the durability and wear resistance of wear strip 18 while enhancing its ability to attenuate vibration transmission to the respective frame member 12, 24.

In the illustrative embodiment, sound deadening material 22 is a polymeric material, such as a foam. An example is a polyurethane foam, but other materials will be apparent to the skilled practitioner. In the illustrative embodiment, an adhesive secures the wheel support strip to the sound deadening material and the sound deadening material to the respective frame member. This may be accomplished by providing the sound deadening material coated on both surfaces with an adhesive in order to secure wheel support strip 20 to the respective frame member 12, 24. Selection of an adhesive is within the skill of the skilled practitioner. The adhesive coatings allow the wear strip to be replaced because they allow the wear strip to be removed at the boundary with the frame member. The ability to replace the wear strip and the fact that the wear strip, not the metal frame, absorb wear, further extends the life of the metal frame. The skilled practitioner would appreciate that other fastening techniques, such as clamps, fasteners and the like, may, alternatingly, be used to affix the wheel support strip and the sound deadening material to the metal frame.

In one embodiment, engaging flanges 28, 30 may be provided respectively on the frame member 12, 14 and the wheel support strip 20. The engaging flanges resist lateral motion of the wheel support strip while avoiding rigid interconnection between the wheel support strip and the respective frame member, thereby reducing noise transmission between the strip and the frame member. The engaging flanges assist the adhesive in resisting lateral motion of the wheel support strip with respect to the side members. The engaging flange 30 on the strip may be readily provided by extruding the strip. The engaging flange 28 on the frame member may be readily provided by extruding the frame member.

Wear strip 18 may be provided in short sections, such as 2.5 meters, or the like. This facilitates replacement of the wear strip. Wheel support strips 20 may have tapered ends 26 that laterally overlap as illustrated in FIG. 6. This ensures that wheels 16 are always riding on a wheel support strip even when transitioning between the wear strips. This reduces noise generated from wheels riding over joints.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A sortation system, comprising:
   a metal frame member;
   a traveling member having a series of wheels supported by said frame member, said traveling member defining an upper surface that supports articles being sorted; and
   a wear strip between said frame member and said wheels, said wear strip comprising at least one wheel support strip and a sound deadening material between said at least one wheel support strip and said frame member;
   wherein said at least one wheel support strip has a surface hardness that is greater than the hardness of said sound deadening material.

2. The sortation system of claim 1 wherein said at least one wheel support strip is made from at least one material chosen from aluminum, steel, and high strength plastic.

3. The sortation system of claim 2 wherein said at least one wheel support strip is hard coated.

4. The sortation system of claim 3 wherein said at least one wheel support strip is hard coated with hard coat anodize.

5. The sortation system of claim 1 wherein said at least one wheel support strip comprises a plurality of wheel support strips, adjacent ends of said wheel support strips laterally overlapping in the direction of movement of said wheels.

6. The sortation system of claim 5 wherein said adjacent ends comprise tapered ends.

7. The sortation system of claim 1 wherein said sound deadening material comprises polymeric foam.

8. The sortation system of claim 7 wherein said polymeric foam comprises polyurethane foam.

9. The sortation system of claim 1 including adhesive securing said sound deadening material to said frame member and said at least one wheel support strip to said sound deadening material.

10. The sortation system of claim 1 wherein said at least one wheel support strip and said frame member have overlapping flanges to resist lateral movement of said wear strip.

11. The sortation system of claim 1 wherein said frame member comprises an extrusion.

12. The sortation system of claim 11 wherein said extrusion comprises an aluminum extrusion.

13. The sortation system of claim 1 wherein said at least one wheel support strip comprises an extrusion.

14. The sortation system of claim 1 comprising at least one chosen from a liner sorter and a carousel sorter.

15. A sortation system, comprising:
   a metal frame member;
   a traveling member having a series of wheels supported by said frame member, said traveling member defining an upper surface that supports articles being sorted;
   a wear strip between said frame member and said wheels, said wear strip comprising at least one wheel support strip and a polymeric foam member between said at least one wheel support strip and said frame member; and
   an adhesive securing said polymeric foam member to said frame member and said wheel support strip to said polymeric foam member.

16. The sortation system of claim 15 wherein said at least one wheel support strip is made from at least one material chosen from aluminum, steel, and high strength plastic.

17. The sortation system of claim 16 wherein said at least one wheel support strip is hard coated.

18. The sortation system of claim 17 wherein said at least one wheel support strip is hard coated with hard coat anodize.

19. The sortation system of claim 15 wherein said at least one wheel support strip comprises a plurality of wheel support strips, adjacent ends of said wheel support strips laterally overlapping in the direction of movement of said wheels.

20. The sortation system of claim 19 wherein said adjacent ends comprise tapered ends.

21. The sortation system of claim 15 wherein said polymeric foam member comprises a polyurethane foam member.

22. The sortation system of claim 15 wherein said at least one wheel support strip and said frame member have overlapping flanges to resist lateral movement of said wear strip.

23. The sortation system of claim 15 wherein said frame member comprises an extrusion.

24. The sortation system of claim 23 wherein said extrusion comprises an aluminum extrusion.

25. The sortation system of claim 15 wherein said at least one wheel support strip comprises an extrusion.

26. The sortation system of claim 15 comprising at least one chosen from a liner sorter and a carousel sorter.

* * * * *